(12) United States Patent
Tajima et al.

(10) Patent No.: US 7,252,899 B2
(45) Date of Patent: Aug. 7, 2007

(54) FUEL CELL

(75) Inventors: Nobuyasu Tajima, Ome (JP); Nobuo Shibuya, Hiratsuka (JP); Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 10/945,267

(22) Filed: Sep. 21, 2004

(65) Prior Publication Data

US 2005/0095467 A1 May 5, 2005

(30) Foreign Application Priority Data

Sep. 30, 2003 (JP) ............................. 2003-342334

(51) Int. Cl.
*H01M 8/00* (2006.01)
*H01M 8/04* (2006.01)
*G06F 1/26* (2006.01)

(52) U.S. Cl. ............................. 429/12; 429/22; 429/34; 713/300

(58) Field of Classification Search .................. 429/12, 429/22, 34
See application file for complete search history.

(56) References Cited

U.S. PATENT DOCUMENTS 5,346,778 A * 9/1994 Ewan et al. .................. 429/19

2004/0013927 A1 * 1/2004 Lawrence et al. ............ 429/34
2004/0118221 A1 * 6/2004 Ante et al. ............. 73/862.471
2005/0058873 A1 * 3/2005 Arthur et al. ................. 429/34

FOREIGN PATENT DOCUMENTS

JP 7-6777 1/1995
JP WO/03/073257 * 9/2003

* cited by examiner

*Primary Examiner*—Jill Warden
*Assistant Examiner*—Helen O. Chu
(74) *Attorney, Agent, or Firm*—Pillsbury Winthrop Shaw Pittman, LLP (57) ABSTRACT

A generator section of a fuel cell comprises an electromotive unit, a fuel tank, a passage through which fluids, including fuel, water, and air, are circulated, and a valve mechanism in the passage. A control section has a connector connectable to an electronic device and controls operation of the generator section. A locking mechanism has a locking member, movable between a locking position in which the electronic device connected to the connector is locked in a connected position and a release position in which the electronic device is unlocked, and an eject member which moves the locking member to the release position. The control section has a detector which detects movement of the eject member and a valve drive unit which closes the valve mechanism of the generator section when the movement of the eject member is detected by the detector.

11 Claims, 10 Drawing Sheets

FUEL CELL

CROSS-REFERENCE TO RELATED APPLICATIONS

This application is based upon and claims the benefit of priority from prior Japanese Patent Application No. 2003-342334, filed Sep. 30, 2003, the entire contents of which are incorporated herein by reference.

BACKGROUND OF THE INVENTION

1. Field of the Invention

The present invention relates to a fuel cell usable as a power source for an electronic device or the like.

2. Description of the Related Art

Currently, secondary batteries, such as lithium ion batteries, are mainly used as power sources for electronic devices, such as portable notebook personal computers, mobile devices, etc. These modern electronic devices have increasingly higher functions and require increased power consumption and longer operating time. To meet these requirements, compact, high-output fuel cells that require no charging are expected as novel power sources. There are fuel cells in various forms. A direct methanol fuel cell (hereinafter referred to as DMFC) that uses a methanol solution as its fuel, in particular, has an advantage over one that uses hydrogen as its fuel in enjoying easier fuel handling and simpler construction. Thus, the DMFC is a currently noticeable power source for an electronic device.

Normally, a DMFC has a housing that houses a generator section for actual power generation and a control circuit section that controls the operation of the generator section. The generator section is provided with a fuel tank, mixing tank, liquid pump, air pump, etc. The fuel tank contains high-concentration methanol. The methanol in the fuel tank is diluted with water in the mixing tank. The liquid pump pressure-feeds the methanol that is diluted in the mixing tank to an electromotive unit. The air pump is used to supply air to the electromotive unit. The electromotive unit has an anode and a cathode. It generates power based on a chemical reaction by feeding the diluted methanol and air to the anode and cathode sides, respectively. As this is done, the electromotive unit is heated to a high temperature by the reaction heat that is produced by a chemical change.

The control circuit section is provided with a printed circuit board in the housing and semiconductor devices mounted on the circuit board. According to a fuel cell described in Jpn. Pat. Appln. KOKAI Publication No. 7-6777, for example, heat that is produced by power generation is discharged into the housing via the surface of the electromotive unit and anode and cathode passages. Air in the housing is discharged for ventilation with a cooling fan or air blower that is attached to the inner surface of the housing.

When the fuel cell constructed in this manner is connected to an electronic device to be operated, a battery of the device is used as an auxiliary power source, since the fuel cell has no auxiliary battery therein. When the electromotive unit of the fuel cell is not in power generating operation, the fuel cell cannot singly provide any auxiliary power source for driving the air pump, liquid pump, solenoid valves, etc.

If the fuel cell is separated from the electronic device while it is operating with the electromotive unit not in power generating operation, therefore, all the pumps, valves, etc. stop in their active state. All of valves for preventing backflow and leakage in liquid and air passages are open during the operation of the fuel cell. If the run is stopped in this state, all the valves are inevitably kept open. If the fuel cell is transported or turned upside down in this state, liquids such as fuel in the fuel cell may possibly leak out. In some cases, moreover, the liquids may flow back in the fuel cell, thereby causing problems in the pumps or other equipment.

BRIEF SUMMARY OF THE INVENTION

A fuel cell according to an aspect of the invention comprises: a generator section having an electromotive unit which generates power based on a chemical reaction, a fuel tank which contains fuel, a passage which is connected to the electromotive unit and through which fluids, including the fuel, water, and air, are circulated, and a valve mechanism which is located in the passage and regulates the circulation of the fluids; a control section which has a connector connectable to an electronic device and controls operation of the generator section; and a locking mechanism having a locking member, movable between a locking position in which the locking member locks the electronic device connected to the connector in a connected position and a release position in which the electronic device is unlocked, and an eject member which moves the locking member from the locking position to the release position. The control section has a detector which detects movement of the eject member, and a valve drive unit which closes the valve mechanism of the generator section when the movement of the eject member is detected by the detector.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A fuel cell according to an embodiment of the present invention will now be described in detail with reference to the accompanying drawings.

Figure 1:
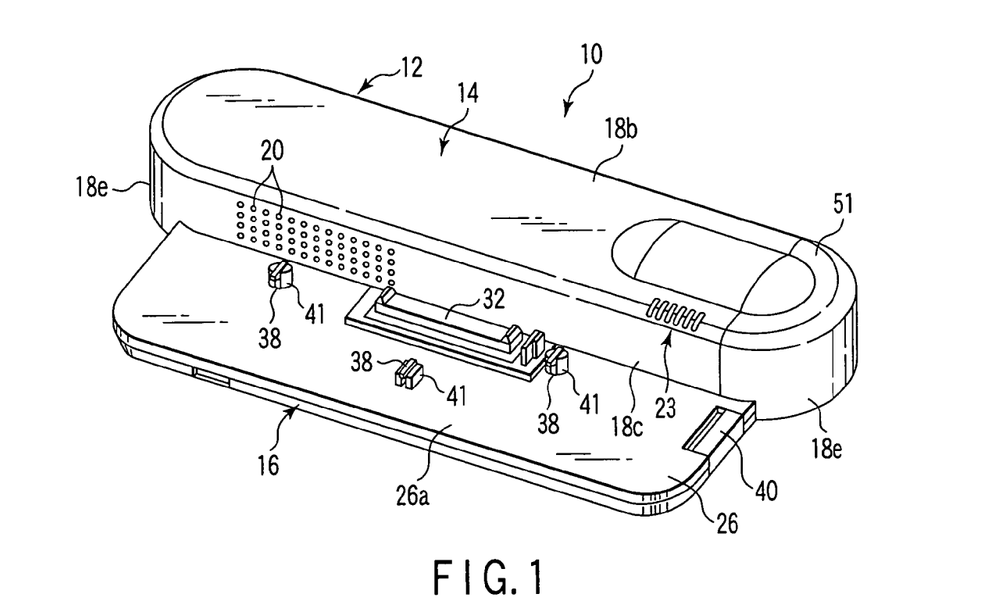
FIG. 1 is a perspective view showing a fuel cell according to an embodiment of the invention.
Figure 2:
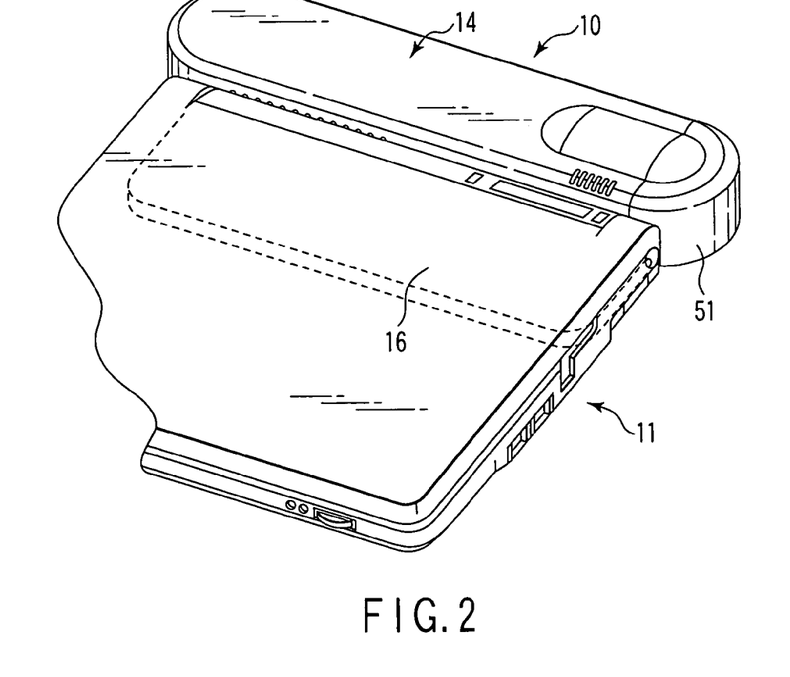
FIG. 2 is a perspective view showing the fuel cell connected to a personal computer.
Figure 3:
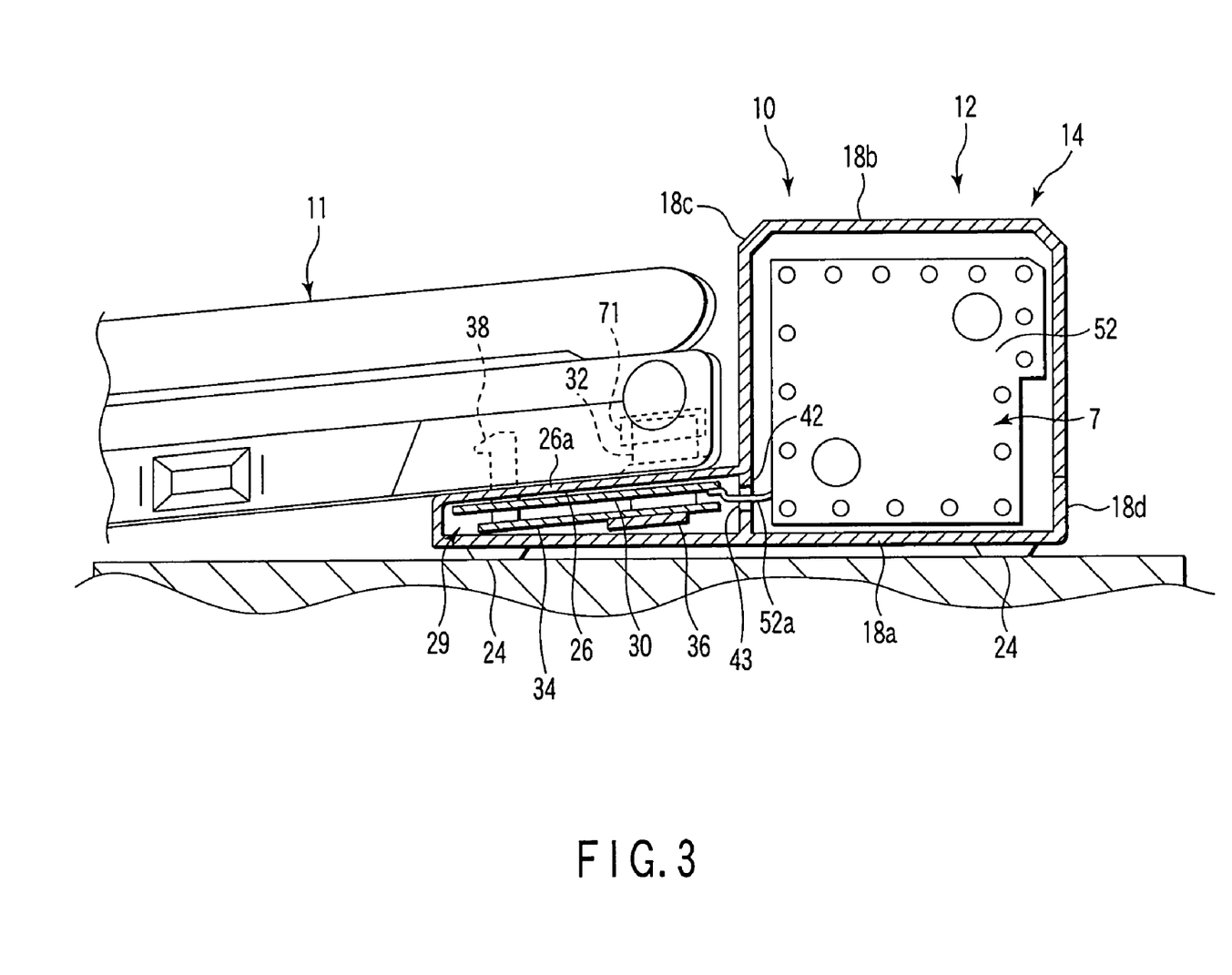
FIG. 3 is a sectional view showing the fuel cell and the personal computer.

As shown in FIGS. 1 to 3, a fuel cell 10 is formed of DMFCs that use methanol as a liquid fuel. It can be used as a power source for an electronic device, such as a personal computer 11.

The fuel cell 10 is provided with a housing 12. The housing 12 has a substantially prism-shaped body 14 that extends horizontally and a bearer section 16 that extends from the body. The bearer section 16 is a flat rectangular structure that can carry a rear portion of the personal computer 11 thereon. The body 14 of the housing 12 houses a fuel tank, electromotive unit, mixing tank, etc., which constitute a generator section 7, as mentioned later. A control section 29, a locking mechanism 25 for locking the computer 11 on the bearer section 16 of the housing 12, etc. are arranged in the bearer section.

As shown in FIGS. 1, 3, 4 and 5, the body 14 has a flat bottom wall 18a, top wall 18b, front wall 18c, rear wall 18d, and a pair of sidewalls 18e. The bottom wall 18a is integral with a bottom wall of the bearer section 16. The top wall 18b extends substantially parallel to the bottom wall 18a. The front wall 18c is situated between the walls 18a and 18b. Each sidewall 18e has an outwardly convex curved surface. A large number of vents 20 are formed in the front wall 18c. Corresponding in position to the vents 20, a large number of vents 21 are formed in the rear wall 18d. One of the sidewalls 18e of the body 14 is formed having a large number of vents 22. Legs 24 are arranged on the outer surface of the bottom wall 18a. Indicators 23 for indicating the operating state of the fuel cell are arranged on the front end portion of the top wall 18b of the body 14.

The bearer section 16 is provided with a flat top wall 26 that extends forward from the lower end portion of the front wall 18c of the body 14. The top wall 26 faces the front half of the bottom wall 18a across a gap and extends slightly declining from the body side. The top wall 26 forms a supporting surface 26a on which the personal computer 11 is placed.

Figure 4:
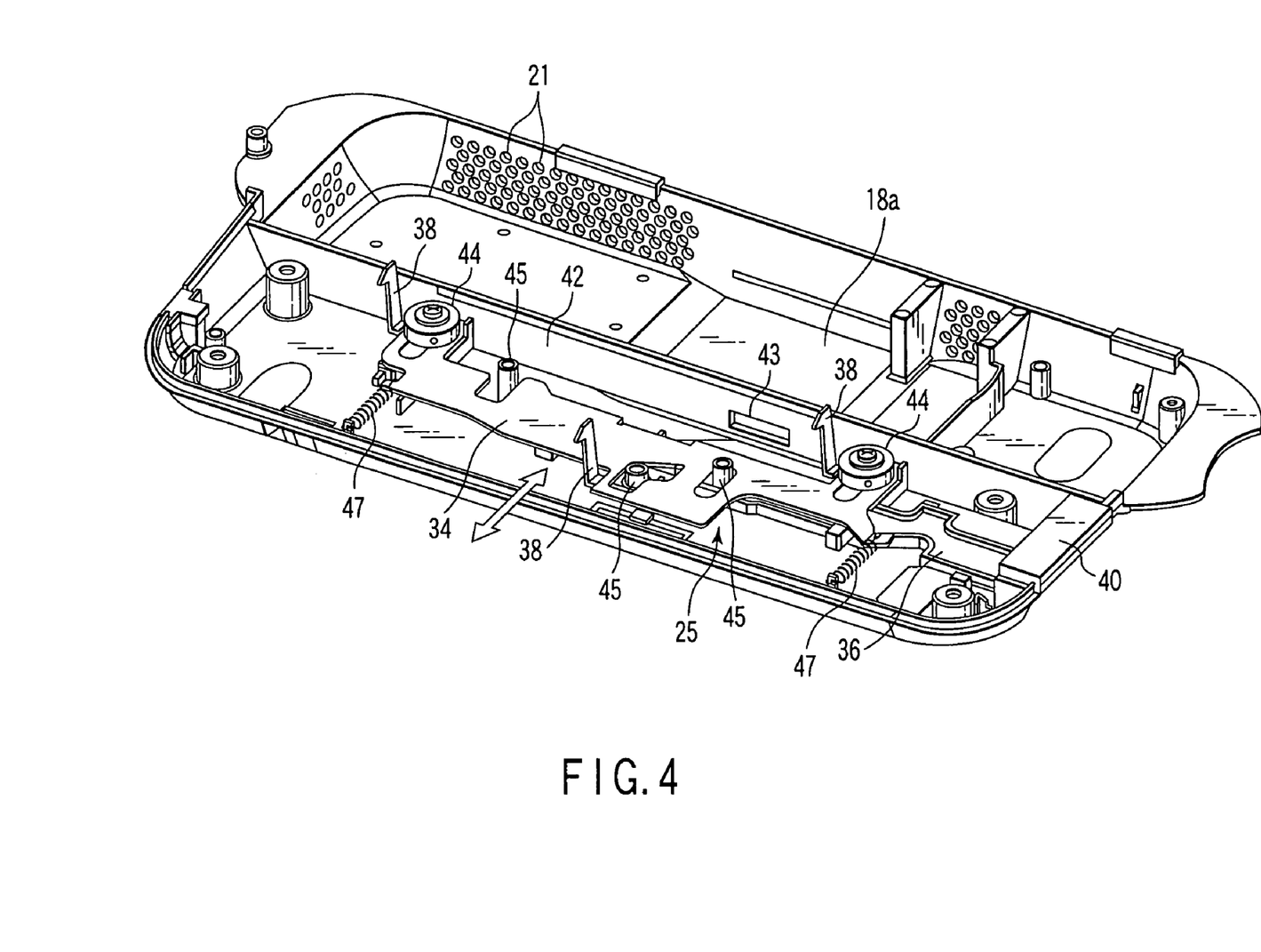
FIG. 4 is a perspective view showing a bottom wall of a housing of the fuel cell.
Figure 5:
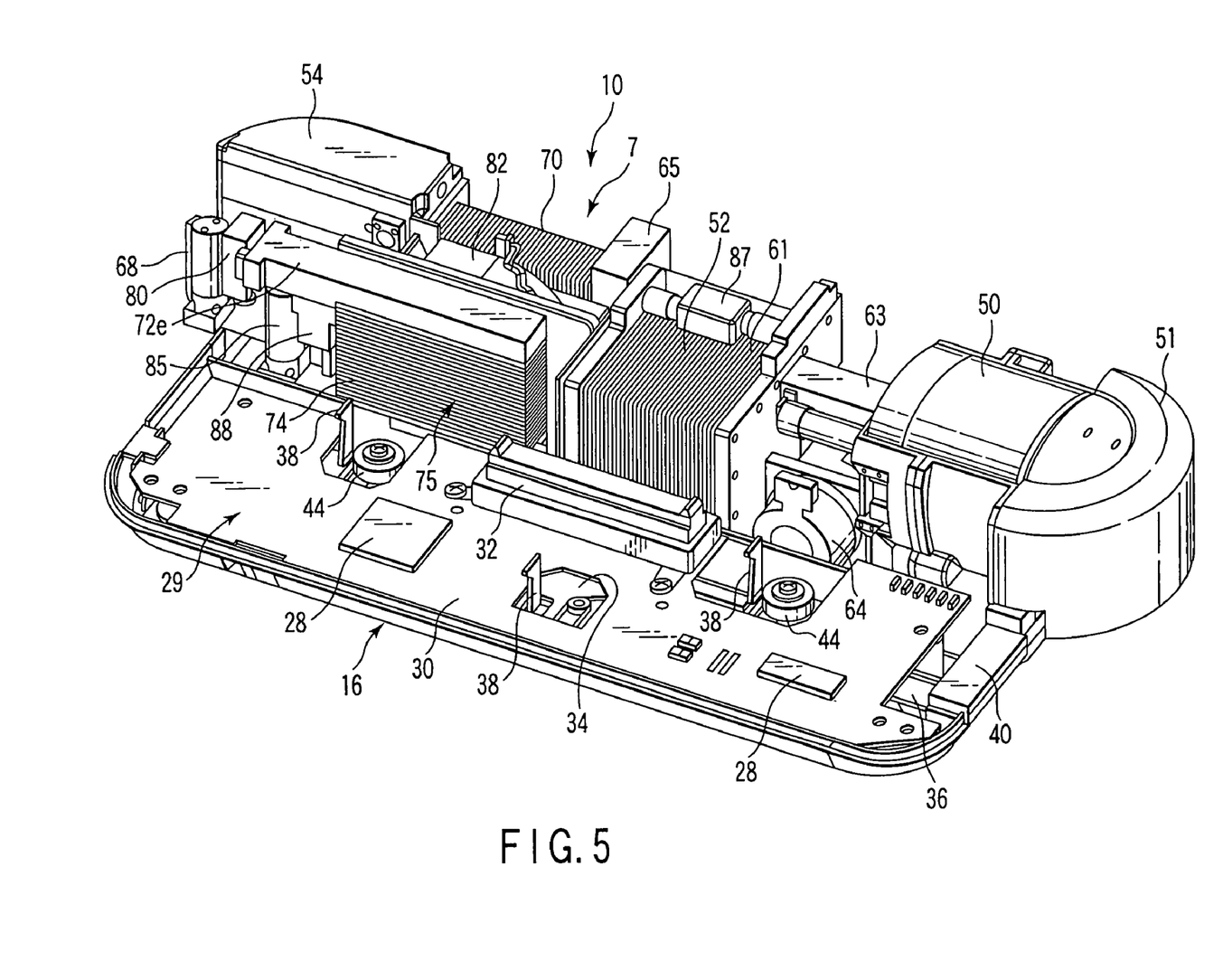
FIG. 5 is a perspective view showing the interior of the fuel cell.

As shown in FIGS. 3 and 4, the interior of the bearer section 16 that is provided with the control section 29 and that of the body 14 in which the generator section 7 is located are divided by a partition wall 42 set up on the bottom wall 18a. The partition wall 42 extends covering the overall length of the housing 12 in its longitudinal direction. The wall 42 is formed having a slot 43 through which wires for electrically connecting the generator section 7 and the control section 29 are passed. Preferably, the opening area of the slot 43 is restricted to about 10% or less of the overall area of the partition wall 42. A plurality of slots 43 may be formed in place of one. Also in this case, the sum of the respective opening areas of the slots is preferably be restricted to about 10% or less of the overall area of the wall 42.

The bearer section 16 houses the control section 29 for controlling the operation of the generator section 7. The control section 29 is provided with a control circuit board 30 that is located in the bearer section 16 and extends substantially parallel to the top wall 26. Electronic components, including semiconductor devices 28 and a connector 32, are mounted on the circuit board 30. The connector 32 is located adjacent to the body 14 in the center of the bearer section 16 and projects from the supporting surface 26a through the top wall 26. As mentioned later, moreover, the control section 29 includes a power source for driving the generator section 7, a driver, etc.

As shown in FIG. 1 and FIGS. 3 to 7, the locking mechanism 25 in the bearer section 16 is provided with a locking plate 34 for use as a locking member and an eject lever 36 for use as an eject member. The locking plate 34 extends substantially parallel to the top wall 26 of the bearer section 16 and in the horizontal direction. It is supported for movement in a front-back direction A by guide rollers 44 and guide pins 45 on the bottom wall 18a. Hooks 38 numbering, e.g., three, are set up on the locking plate 34 and project from the supporting surface 26a through the top wall 26. The locking plate 34 has an engaging projection 34a that projects from its central portion toward the bottom wall 18a. Three positioning protrusions 41 are formed individually adjacent to the hooks 38 on the supporting surface 26a.

Figure 6:
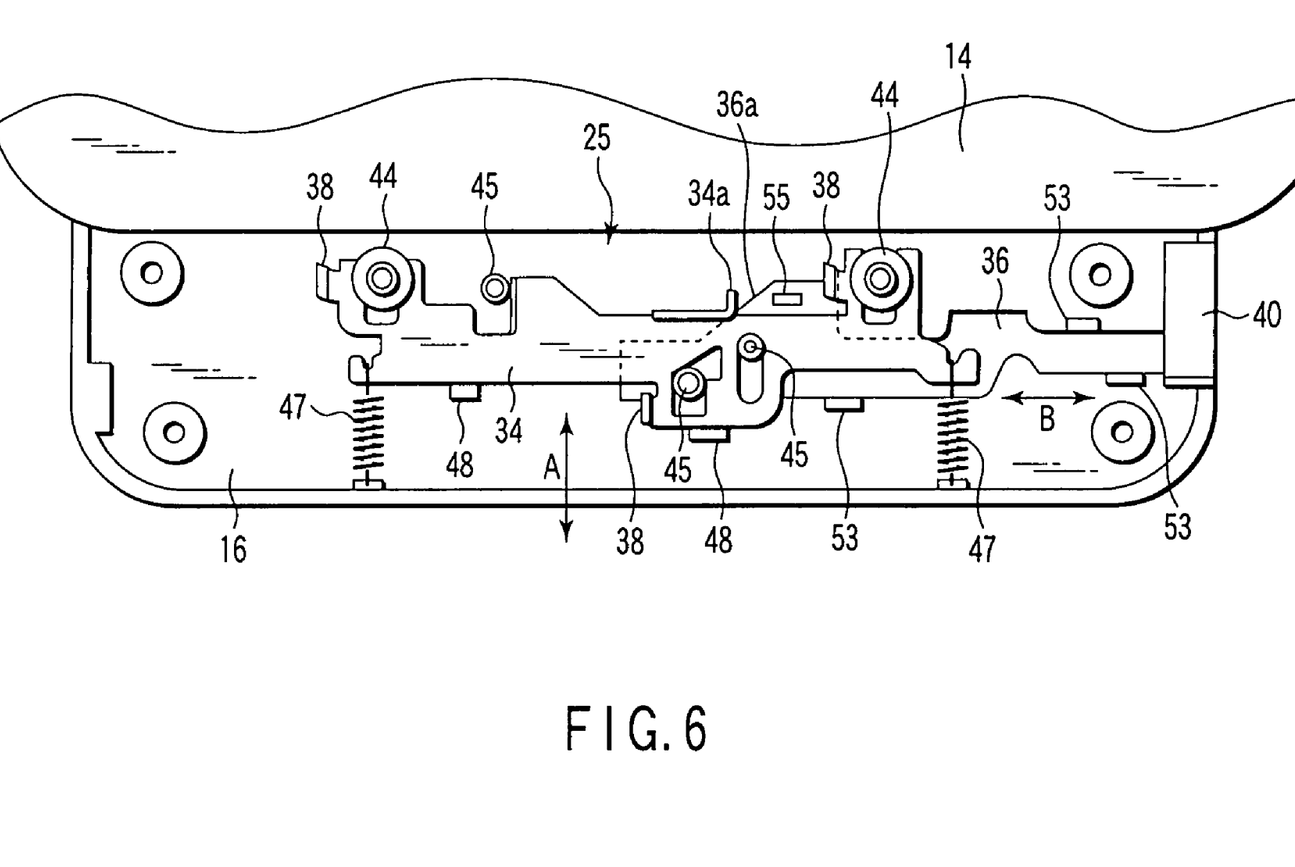
FIG. 6 is a plan view showing a locking mechanism of the fuel cell.
Figure 7:
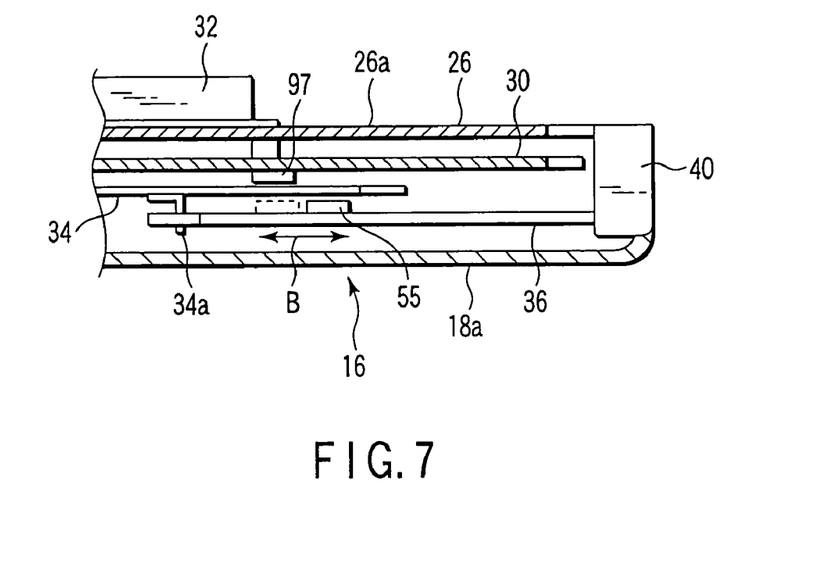
FIG. 7 is a sectional view showing the locking mechanism of the fuel cell.

A pair of tension springs 47 are stretched between the locking plate 34 and the bottom wall 18a. The locking plate 34 is urged toward an illustrated locking position by the springs 47 and held in the locking position by engaging a stopper 48 that protrudes from the bottom wall 18a. The locking plate 34 is moved to an unlocking position as it is pressed toward the body 14, resisting the urging force of the springs 47.

The eject lever 36 is located between the bottom wall 18a and the locking plate 34 and extends substantially parallel to the top wall 26 of the bearer section 16. The lever 36 is supported by guide protrusions 53 on the bottom wall 18a for movement in a left-right direction B that is perpendicular to the moving direction of the locking plate 34. An eject button 40 for actuating the eject lever 36 is attached to one end of the eject lever 36 and exposed through one side edge portion of the bearer section 16. A pressure surface 36a is formed on the other end portion of the eject lever 36. It extends at an angle to the moving direction B of the eject lever. The pressure surface 36a is in engagement with the engaging projection 34a of the locking plate 34. If the eject lever 36 is pushed in from its illustrated initial position to a pushed-in position by means of the eject button 40, the pressure surface 36a presses the engaging projection 34a, thereby moving the locking plate 34, along with the hooks 38, from the locking position to the unlocking position.

A magnet 55 that serves as a detecting element is mounted on the eject lever 36. A magnetic sensor 97 for use as a detector is provided on the back of the control circuit board 30. It is situated adjacent to the magnet 55. As the eject lever 36 moves from the initial position to the pushed-in position, the magnet 55 faces the sensor 97 and is detected by it. Thus, the magnetic sensor 97 detects the movement of the lever 36 from the initial position toward the pushed-in position, thereby detecting start of eject operation. If the eject button 40 is released from pressure, the locking plate 34 is returned to the locking position by the urging force of the tension springs 47. As this is done, the eject lever 36 returns to its initial position.

Figure 8:
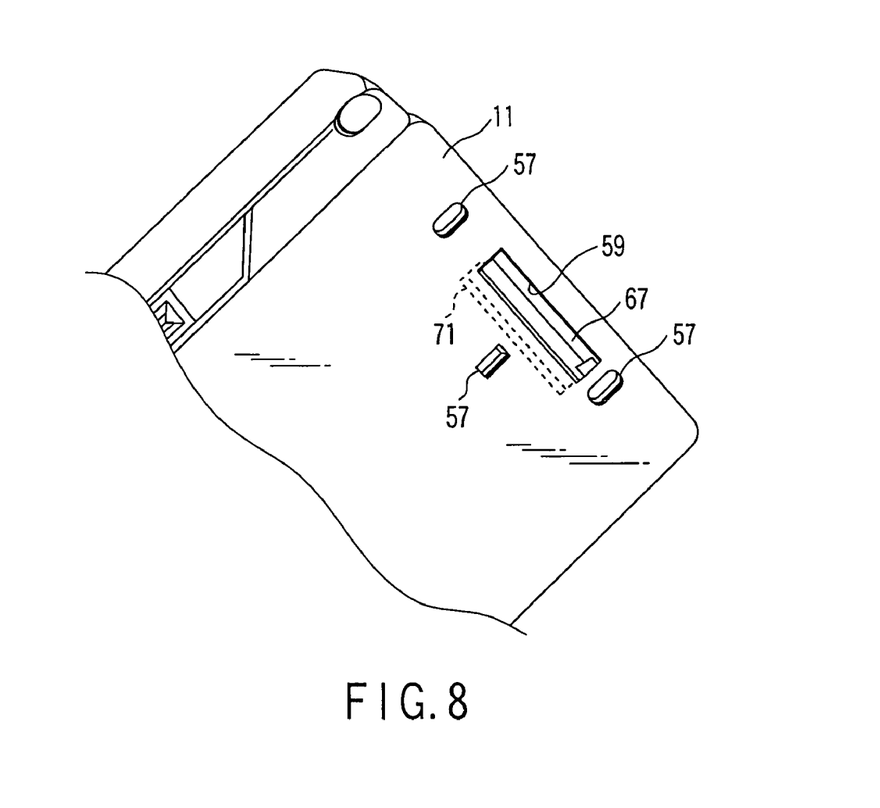
FIG. 8 is a perspective view showing a terminal area of the personal computer.

Corresponding in position to the three positioning protrusions 41 of the bearer section 16 and the hooks 38 of the locking mechanism 25, as shown in FIGS. 2, 3 and 8, three engaging recesses 57 are formed in the rear end portion of the bottom wall of the personal computer 11. Located between the engaging recesses 57 are a rectangular opening 59 into which the connector 32 of the bearer section 16 can be inserted and a shutter 67 for opening and closing the opening 59. A connector 71 that can engage the connector 32 of the bearer section 16 is provided in the rear end portion of the bottom wall of the personal computer 11 so as to face the opening 59.

The rear end portion of the personal computer 11 is placed in position on the supporting surface 26a of the bearer section 16 with the positioning protrusions 41 in engagement with the engaging recesses 57, individually. Thereupon, the connector 32 of the bearer section 16 opens the shutter 67 of the personal computer 11, is inserted into the opening 59, and engages the connector 71 of the computer. Thus, the fuel cell 10 and the personal computer 11 are connected mechanically and electrically to each other.

As the rear end portion of the personal computer 11 is placed in position on the bearer section 16, the hooks 38 of the locking mechanism 25 are pressed and temporarily moved to the unlocking position. Thereafter, the hooks 38 engage their corresponding engaging recesses 57 of the computer and return to the locking position. Thus, the locking mechanism 25 locks the personal computer 11 in a given connected position.

As shown in FIGS. 1, 3, 5, 9 and 10, the generator section 7 comprises a fuel tank 50 on one side in the body 14, an electromotive unit 52 in the central portion of the body, and a mixing tank 54 on the other side in the body. The electromotive unit 52 generates power based on a chemical reaction. The fuel tank 50 contains high-concentration methanol as a liquid fuel. The tank 50 is formed as a cartridge that can be attached to and detached from the body 14. One side portion of the body 14 is formed as a cover 51 that can be removed when the tank 50 is attached or detached.

Figure 11:
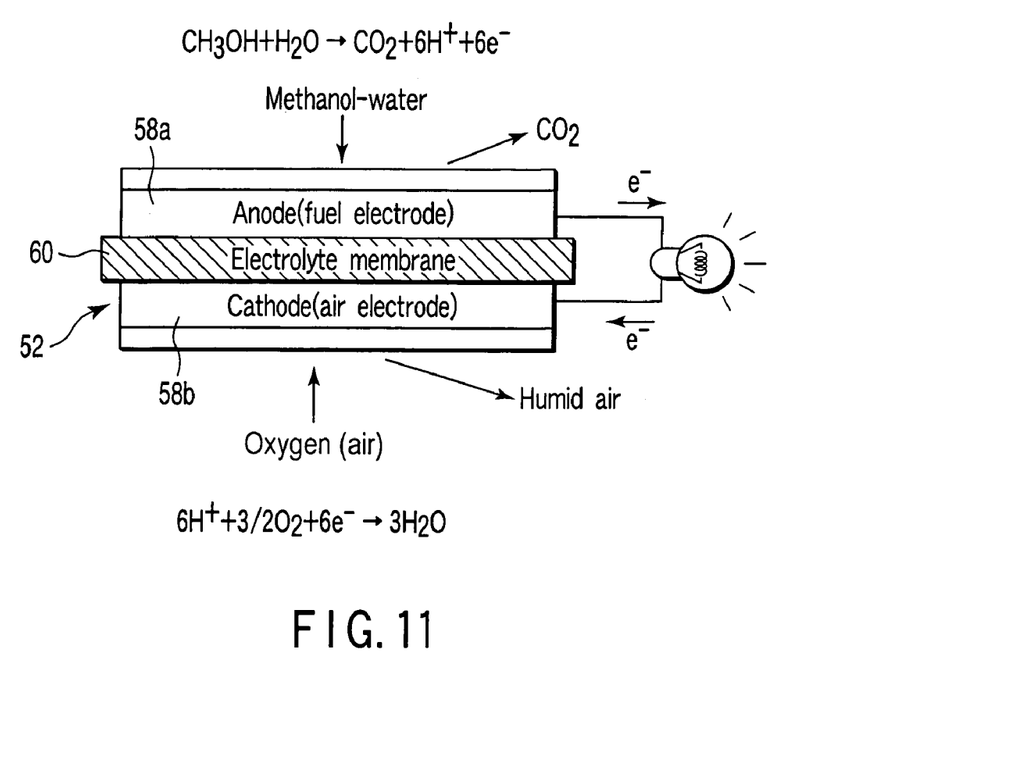
FIG. 11 is a view typically showing a cell structure of an electromotive unit of the fuel cell.

The fuel tank 50 is connected to the mixing tank 54 by means of a fuel supply line (not shown). The fuel supply line is provided with a first liquid pump 56, which feeds the fuel from the fuel tank to the mixing tank. As shown in FIG. 11, the electromotive unit 52 is formed by laminating a plurality of cells. Each cell is formed of an anode (fuel electrode) 58a, a cathode (air electrode) 58b, and an electrolyte membrane 60 between the electrodes. A large number of cooling fins 61 are arranged around the electromotive unit 52.

As shown in FIGS. 3, 5, 9, 10 and 12, the body 14 houses an air pump 64 that supplies air to the cathode 58b of the electromotive unit 52 through an air valve 63. The air pump 64 constitutes an air supply section. A fuel supply pipe 66a and a fuel recovery pipe 66b are connected between the electromotive unit 52 and the mixing tank 54 and extend parallel to each other. They form a fuel circulation passage through which fuel as a liquid is circulated between the anode 58a of the electromotive unit 52 and the mixing tank 54. The fuel supply pipe 66a is connected with a second liquid pump 68 that feeds the fuel from the mixing tank 54 to the electromotive unit 52. The fuel recovery pipe 66b is provided with a gas-liquid separator 65 for separating the fuel discharged from the electromotive unit 52 from carbon dioxide produced by the chemical reaction. A large number of vertically extending radiator fins 69 are mounted around the fuel supply pipe 66a and the fuel recovery pipe 66b, and constitute a first radiator section 70. The vents 21 in the rear wall 18d of the body 14 are opposed to the first radiator section 70.

Figure 10:
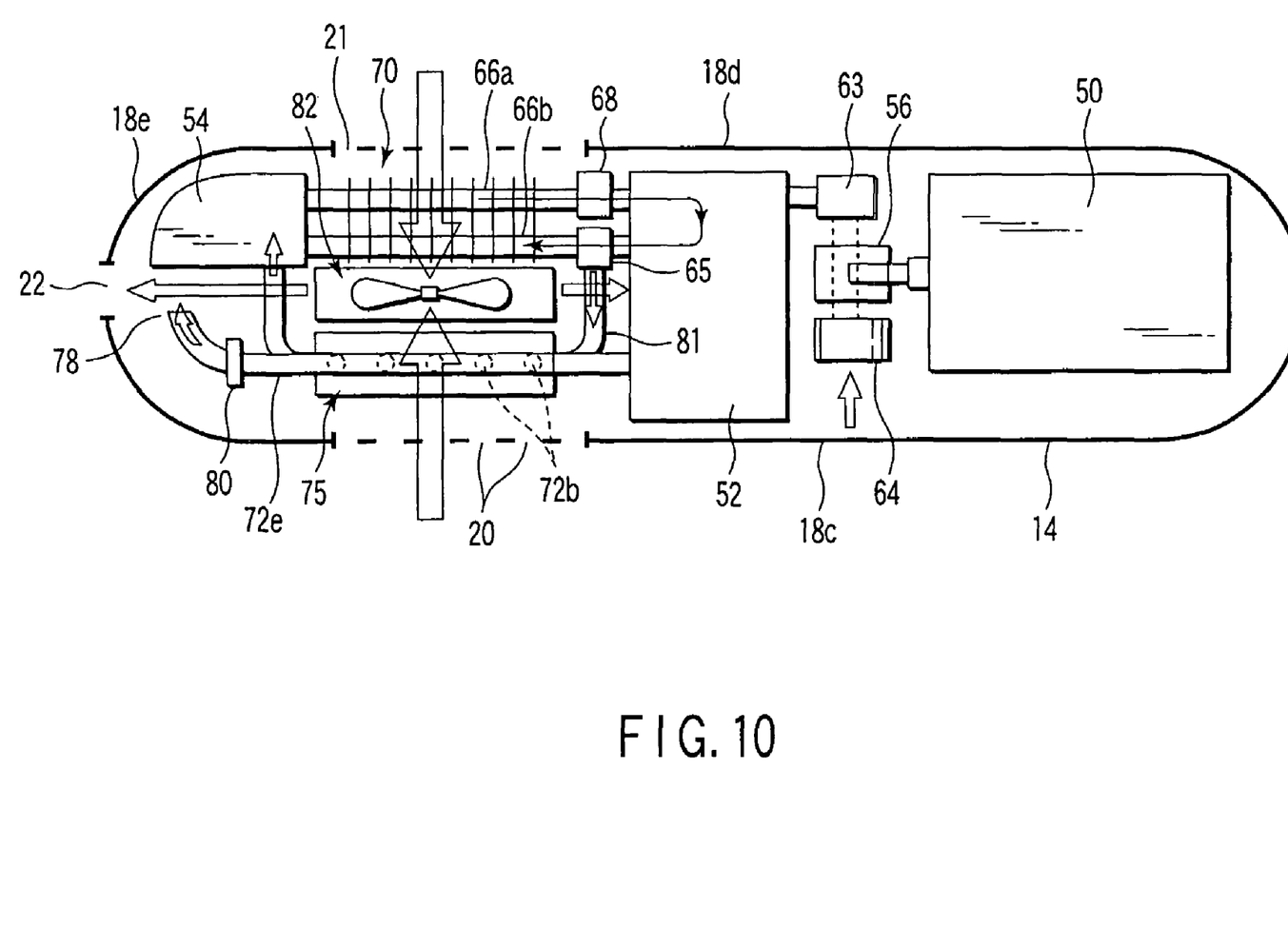
FIG. 10 is a view schematically showing a generator section of the fuel cell.
Figure 12:
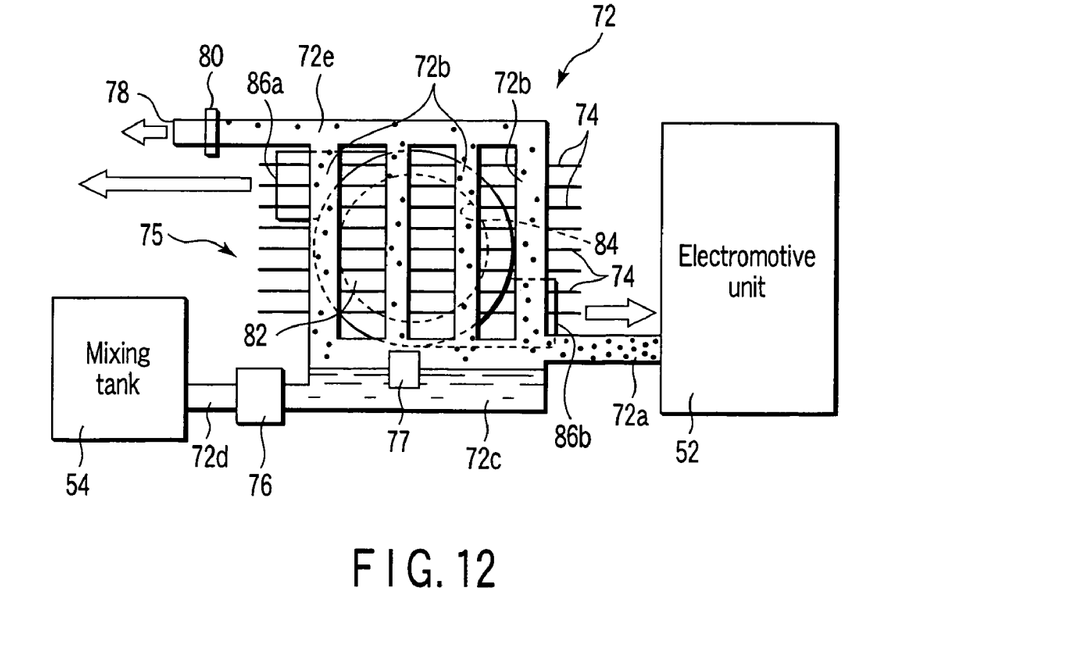
FIG. 12 is a view typically showing a cathode passage and a second radiator section of the fuel cell.

A discharge pipe 72 is connected to the electromotive unit 52 and forms a cathode passage through which products of power generation and air, as fluids, are discharged. The cathode passage has a first passage 72a, branch passages 72b, reservoir portion 72c, recovery passage 72d, and second passage 72e. The first passage 72a extends from the electromotive unit 52. The branch passages 72b diverge from the first passage and extend at an angle to the horizontal direction. The reservoir portion 72c communicates with the first passage and the respective lower ends of the branch passages. It stores water discharged from the first passage and water condensed in the branch passages. The recovery passage 72d guides the water stored in the reservoir portion into the mixing tank 54. The second passage 72e communicates with the respective upper ends of the branch passages. In the present embodiment, the branch passages 72b extend individually in the vertical direction.

The recovery passage 72d is provided with a recovery pump 76 that supplies the water in the reservoir portion 72c to the mixing tank 54. Located in the reservoir portion 72c is a water level detector 77 that detects the level of the water in the reservoir portion.

A large number of horizontally extending radiator fins 74 are mounted around the discharge pipe 72 that forms the branch passages 72b, and constitute a second radiator section 75. The second radiator section 75, which includes the branch passages 72b, is opposed substantially parallel to the first radiator section 70 with a gap between them. The second passage 72e extends substantially horizontally and has an exhaust port 78, which is situated near the vents 22 of the body 14 and opens toward the vents 22. In the second passage 72e, an exhaust valve 80 is located near the exhaust port 78. The second passage 72e is provided with a gas discharge pipe 81, which guides carbon dioxide separated by the gas-liquid separator 65 into the second passage 72e. The vents 20 that are formed in the front wall 18c of the body 14 are opposed to the second radiator section 75.

Figure 9:
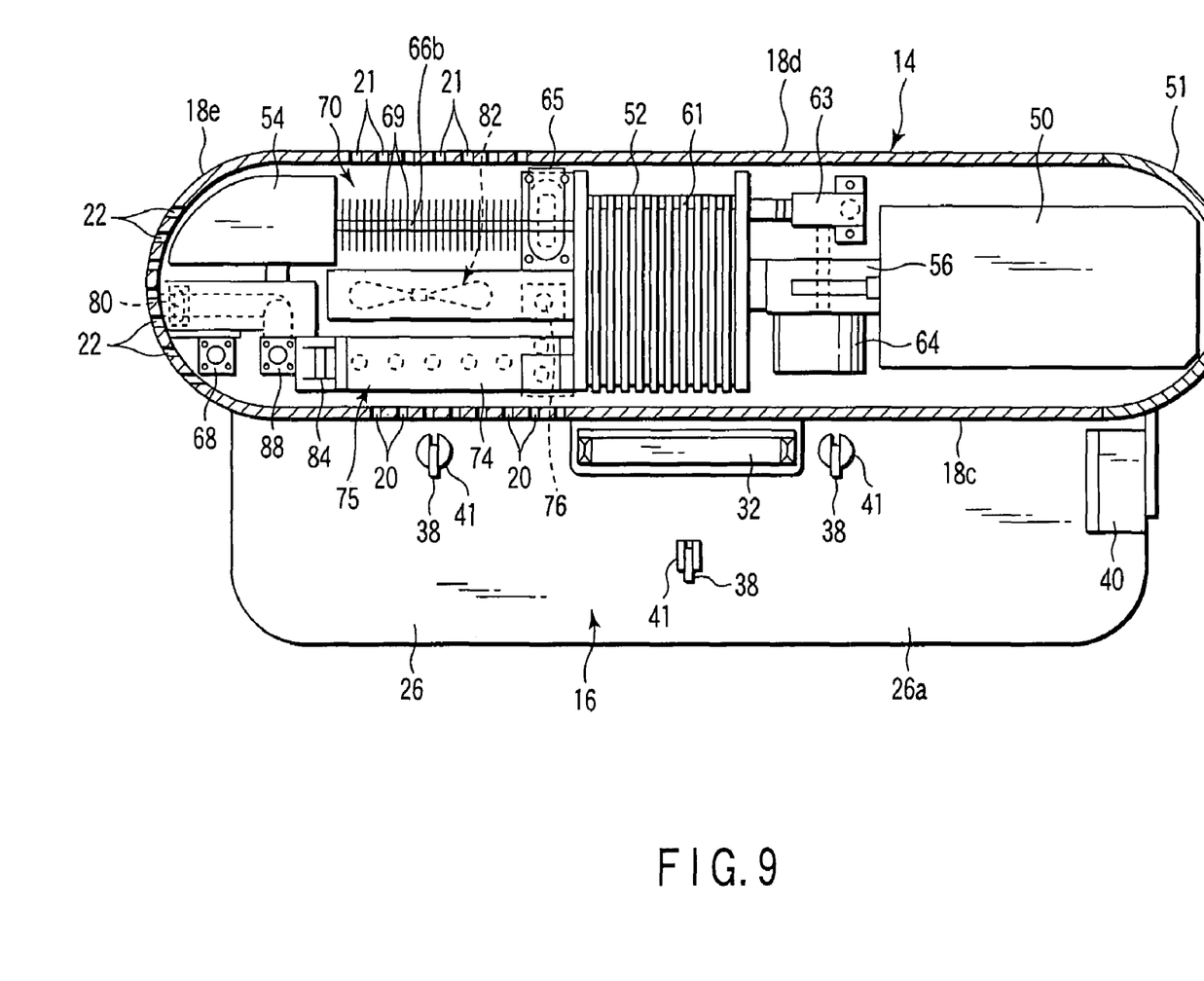
FIG. 9 is a plan view, partially in section, showing the fuel cell.

A cooling fan 82, a centrifugal fan, is provided between and opposite the first radiator section 70 and the second radiator section 75. The cooling fan 82 is located so that the rotation axis of its blades extends substantially horizontally and at right angles to the first and second radiator sections 70 and 75. The fan 82 has a fan case that covers the blades. As shown in FIG. 9, the case is formed having an intake port 84 opposed to the first radiator section 70, another intake port 84 opposed to the second radiator section 75, and two exhaust ports 86a and 86b that open in a direction tangential to the rotating direction of the blades. The one exhaust port 86a opens toward the vents 22 of the body 14, and the other exhaust port 86b toward the electromotive unit 52.

The generator section 7 is provided with a tank valve 87, a concentration sensor 88, and a concentration detection pump 85. The valve 87 is located in a passage that is connected to the mixing tank 54. The sensor 88 detects the concentration of fuel in the mixing tank 54. The pump 85 circulates the fuel in the mixing tank through the sensor. The tank valve 87, air valve 63, and exhaust valve 80 are formed of a solenoid valve each, and constitute valve mechanisms that open and close their corresponding passages.

Figure 13:
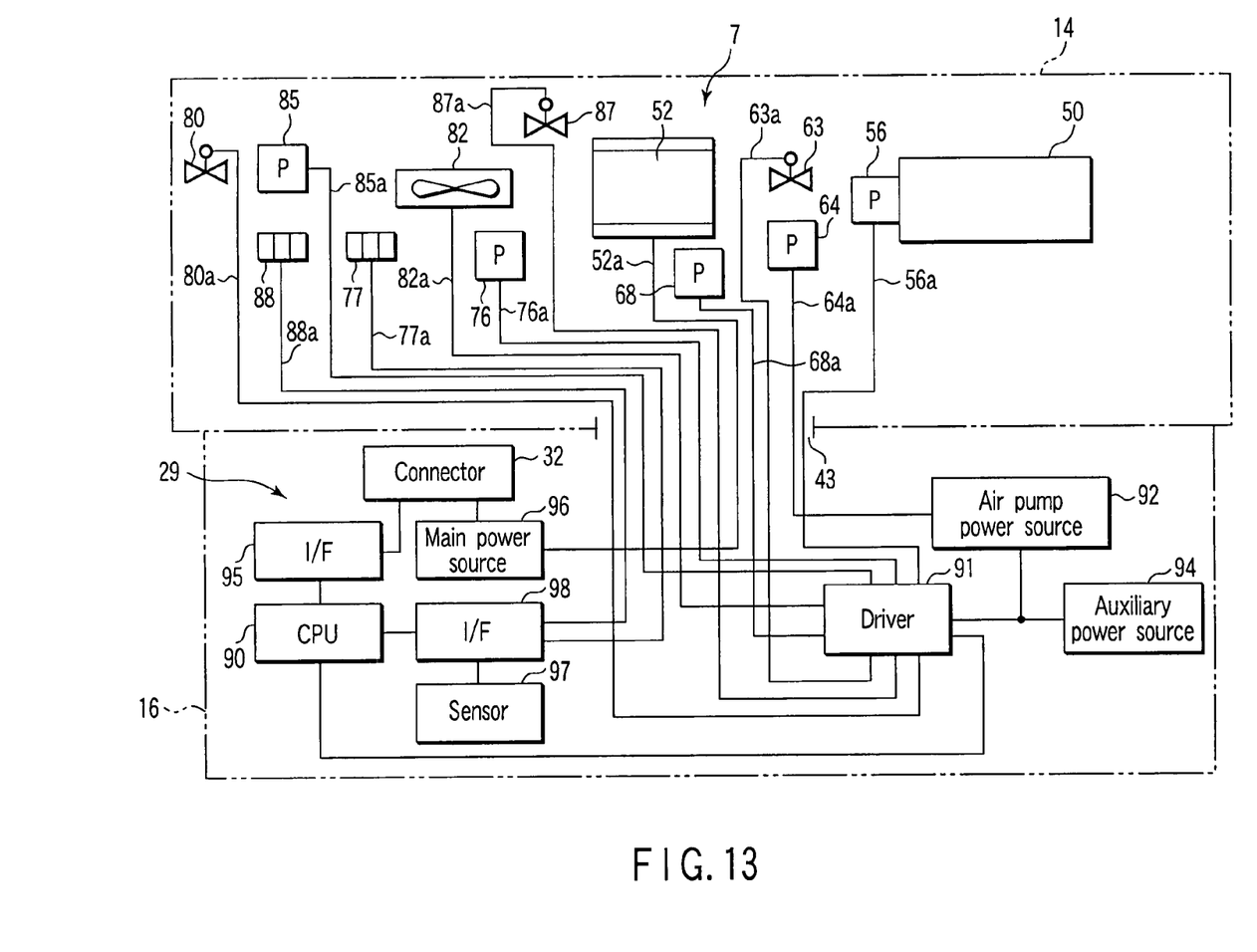
FIG. 13 is a block diagram showing the generator section and a control section of the fuel cell.

As shown in FIG. 13, a control circuit of the control section 29 in the bearer section 16 comprises a CPU 90, driver 91, air pump power source 92, and auxiliary power source 94. The driver 91 is connected to the CPU and serves both as a valve drive unit and as an auxiliary drive unit. The power sources 92 and 94 are connected to the driver. The connector 32 is connected to the CPU 90 through an interface 95 and also connected to a main power source 96.

The first and second liquid pumps 56 and 68, recovery pump 76, and concentration detection pump 85, which are arranged in the body 14 and constitute the generator section 7, are connected electrically to the control circuit board 30 by wires 56a, 68a, 76a and 85a, respectively. They are connected electrically to the driver 91 through the control circuit board. The air pump 64 is connected electrically to the control circuit board 30 by a wire 64a and connected to the air pump power source 92 through the control circuit board. The cooling fan 82 is connected electrically to the control circuit board 30 by a wire 82a and also connected to the driver 91. The water level detector 77 and the concentration sensor 88 are connected to the control circuit board 30 by wires 77a and 88a, respectively. They deliver their respective detection signals to the CPU 90 through an interface 98. The magnet sensor 97 for detecting the movement of the eject lever 36 is connected to the CPU 90 through the interface 98.

The electromotive unit 52 is connected to the main power source 96 by a wire 52a and supplies generated power through the power source 96 and the connector 32. The air valve 63, exhaust valve 80, and tank valve 87 are connected electrically to the control circuit board 30 by wires 63a, 80a and 87a, respectively, and also connected to the driver 91.

The wires that connect the generator section 7 and the control section 29 are pulled around from inside the body 14 into the bearer section 16 through the slot 43 in the partition wall 42.

If the fuel cell 10 constructed in this manner is used as a power source for the personal computer 11, the rear end portion of the computer is first placed on the bearer section 16 of the fuel cell, connected mechanically and electrically to the fuel cell through the connector 32, and locked in the given connected position. In this state, power generation by the fuel cell 10 is started. At the start of operation, a battery of the personal computer 11 is used to actuate the pumps and open the valves. After power generation by the electromotive unit 52 is started, the individual elements are driven by utilizing electric power supplied from the electromotive unit.

First, under the control of the control section 29, methanol is supplied from the fuel tank 50 to the mixing tank 54 by the first liquid pump 56 and diluted to a given concentration with water for use as a solvent that flows back from the electromotive unit 52. The methanol that is diluted in the mixing tank 54 is supplied through the anode passage to the anode 58a of the electromotive unit 52 by the second liquid pump 68. Air is supplied to the cathode 58b of the electromotive unit 52 by the air pump 64. As shown in FIG. 11, the supplied methanol and air react chemically in the electrolyte membrane 60 between the anode 58a and the cathode 58b. Thereupon, electric power is generated between the anode 58a and the cathode 58b. The power generated in the electromotive unit 52 is supplied to the personal computer 11 through the control circuit board 30, main power source 96, and connector 32.

As the power generation reaction proceeds, carbon dioxide and water are produced as reaction products on the sides of the anode 58a and the cathode 58b, respectively, of the electromotive unit 52. The carbon dioxide that is formed on the anode side and the methanol are fed into the gas-liquid separator 65 and subjected to gas-liquid separation in it. Thereafter, the carbon dioxide is delivered to the cathode passage through the gas discharge pipe 81. The methanol is returned to the mixing tank 54 through the anode passage.

As shown in FIGS. 10 and 12, most of the water produced on the side of the cathode 58b is converted into steam, which, along with air, is discharged into the cathode passage. The discharged water and steam pass through the first passage 72a, and the water is delivered to the reservoir portion 72c. The steam and air flow upward through the branch passages 72b to the second passage 72e. As this is done, the steam that flows through the branch passages 72b is cooled and condensed by the second radiator section 75. Water that is produced by the condensation flows downward in the branch passages 72b by gravity and is recovered in the reservoir portion 72c. The water recovered in the reservoir portion 72c is delivered to the mixing tank 54 by the recovery pump 76, mixed with the methanol, and then fed again to the electromotive unit 52.

Some of the air and steam that are fed to the second passage 72e pass through the exhaust valve 80, and are discharged into the body 14 through the exhaust port 78 and further to the outside through the vents 22 of the body. The carbon dioxide that is discharged from the side of the anode 58a of the electromotive unit 52 passes through the second passage 72e, and is discharged into the body 14 through the exhaust port 78 and further to the outside through the vents 22 of the body.

While the fuel cell 10 is operating, the cooling fan 82 is actuated, whereupon the outside air is introduced into the body 14 through the vents 20 and 21 in the body. The outside air that is introduced into the body 14 through the vents 21 and the air in the body 14 pass around the first radiator section 70 to cool it, and are then sucked into the fan case through the corresponding intake port 84 for the cooling fan 82. Thus, the methanol that flows through the anode passage is cooled to lower the heating temperature of the electromotive unit 52. The outside air that is introduced into the body 14 through the vents 20 and the air in the body 14 pass around the second radiator section 75 to cool it, and are then sucked into the fan case through the other intake port 84 for the fan 82. Thus, the air and the reaction products that flow through the cathode passage are cooled.

The air sucked into the fan case is discharged into the body 14 through the exhaust ports 86a and 86b. The air discharged through the exhaust port 86a passes around the mixing tank 54 to cool it, and is discharged to the outside through the vents 22. As this is done, the air discharged through the exhaust port 86a is mixed with the air, steam, and carbon dioxide that are discharged through the exhaust port 78 of the cathode passage. The resulting mixture is discharged to the outside of the body 14 through the vents 22. The air discharged through the other exhaust port 86b is discharged from the body 14 after having cooled the electromotive unit 52 and its surroundings.

The concentration of methanol in the mixing tank 54 is detected by the concentration sensor 88. The control section 29 actuates the recovery pump 76 in accordance with the detected concentration to feed the water in the reservoir portion 72c into the tank 54, thereby keeping the methanol concentration constant. The amount of water recovery or steam condensation in the cathode passage is adjusted by controlling the cooling capacity of the second radiator section 75 in accordance with the level of the water recovered in the reservoir portion 72c. In this case, the cooling capacity of the radiator section 75 is adjusted to regulate the water recovery amount by controlling the drive voltage for the cooling fan 82 in accordance with the water level detected by the water level detector 77. The control section 29 controls the flow rate of the recovery pump 76 in accordance with the level of the water recovered in the reservoir portion 72c, thereby keeping the amount of water in the reservoir portion 72c within the given range.

In removing the personal computer 11 from the fuel cell 10, the eject button 40 is depressed to move the eject lever 36 from the initial position to the pushed-in position. Thereupon, the locking plate 34 is pressed by the lever 36 and moves from the locking position to the unlocking position. In consequence, the hooks 38 are disengaged from their corresponding engaging recesses 57 of the personal computer 11, whereupon the computer is unlocked. The computer is pulled up from the bearer section 16 with the locking plate 34 kept in the unlocking position, and the connector 71 is removed from the connector 32 of the fuel cell 10 and disengaged from the positioning protrusions 41. Thus, the personal computer 11 can be removed.

If the eject lever 36 is moved in this manner from the initial position to the pushed-in position to unlock the personal computer 11, the magnet 55 on the eject lever 36 moves to a position where it faces the magnet sensor 97 before the lever 36 reaches the pushed-in position after starting to move from the initial position, as shown in FIG. 7. Thereupon, the sensor 97 detects the magnet 55 and the movement of the lever 36 from the initial position toward the pushed-in position. The CPU 90 detects the movement of the eject lever 36, i.e., the start of the eject operation, in response to a detection signal from the magnet sensor 97. It causes the driver 91 to shift and close the air valve 63, exhaust valve 80, and tank valve 87, thereby closing the corresponding passages of the generator section 7. Further, the CPU 90 urges the driver 91 to stop the operations of the air pump 64, first and second liquid pumps 68, recovery pump 76, concentration detection pump 85, and cooling fan 82. Thereupon, the control section 29 switches the generator section 7 to a non-operating state before the personal computer 11 is released from the lock by the locking plate 34 after the start of the eject operation. After the generator section 7 is securely rendered non-operating, the computer 11 is unlocked and allowed to be removed from the fuel cell 10.

According to the fuel cell 10 constructed in this manner, the start of the eject operation for the personal computer 11 is detected without delay, and the generator section 7 can be securely switched off before the unlocked computer is removed from the fuel cell. Even if the personal computer is removed from the fuel cell 10 with the electromotive unit 52 not in power generating operation, therefore, the valves can be closed, and the operations of the pumps and the cooling fan can be terminated. Accordingly, the valves cannot be left open, so that leakage of liquids, such as the fuel in the fuel cell 10, can be securely prevented even when the fuel cell 10 is transported or turned upside down. At the same time, the liquids can be prevented from flowing backward, and occurrence of problems in the pumps and other equipment can be restrained. Thus, leakage and backflow of fuel, water, etc., can be prevented to ensure an fuel cell that is improved in safety and reliability.

According to the fuel cell 10, moreover, the exhaust temperature of the cathode is lowered to reduce evaporation of water by means of the first and second radiator sections 70 and 75 and the cooling fan 82. In this way, the water can be recovered efficiently and reused for the power generation reaction. Accordingly, the problem of water shortage can be solved, and fuel of a desired concentration can be supplied to the electromotive unit 52. At the same time, the heating temperature of the electromotive unit 52 can be lowered by cooling the anode passage, so that the exhaust temperature of the cathode can be lowered more efficiently. Thus, the resulting fuel cell can perform prolonged stable power generation.

According to the present embodiment, furthermore, exhaust air from the cooling fan 82 is mixed with exhaust air from the cathode passage and discharged to the outside of the body 14. Since the exhaust air from the cathode passage contains some moisture, water drops may possibly be formed around the vents 22 of the body 14. However, the moisture can be reduced to prevent formation of water drops by mixing the air from the cathode passage with the exhaust air from the fan 82 in the aforesaid manner. Thus, problems that are attributable to water drops can be prevented to ensure a high-reliability fuel cell.

The present invention is not limited directly to the embodiment described above, and in carrying out the invention, its components may be modified and embodied without departing from the scope or spirit of the invention. Further, various inventions may be made by suitably combining a plurality of components described in connection with the foregoing embodiment. For example, some of the components according to the above-described embodiment may be omitted. Furthermore, components of different embodiments may be combined as required.

According to the embodiment described above, the generator section comprises the fuel tank 50, electromotive unit 52, first and second radiator sections 70 and 75, and mixing tank 54 that are arranged in the order named. However, this order of arrangement may be variously changed as required. If necessary, moreover, the arrangement of the passages and the valves and the number of valves may also be changed. The detector for detecting the movement of the eject lever is not limited to a magnetic sensor, and may alternatively be a sensor that detects the movement electrically or mechanically. Further, the locking mechanism is not limited to a combination of a locking plate and hooks, and may be any other structure that can lock an electronic device in a connected position.

The fuel cell according to the present invention is not limited to use with the personal computer described above, and may also be used as a power source for any other electronic devices, such as mobile devices, portable terminals, etc. The fuel cells are not limited to the DMFCs and may be of any other types, such as polymer electrolyte fuel cells (PEFCs). The cooling fan is not limited to the centrifugal fan and may alternatively be an axial flow fan.

What is claimed is:

1. A fuel cell system comprising:
   an electromotive unit which generates power based on a chemical reaction, an air pump which supplies air to the electromotive unit, a fuel tank which contains fuel, a passage which is connected to the electromotive unit and through which fluids, including the fuel, water, and air, are circulated, a liquid pump which is located in the passage and supplies the fuel to the electromotive unit, and a valve mechanism which is located in the passage and regulates the circulation of the fluids;
   a connector which is connectable to an electronic device and applies the power generated by the electromotive unit to the electronic device;
   a locking mechanism having a locking member, movable between a locking position in which the locking member locks the electronic device connected to the connector in a connected position and a release position in which the electronic device is unlocked, and an eject member which moves the locking member from the locking position to the release position;
   a detector which detects movement of the eject member; and
   a drive unit which closes the valve mechanism and stops the air pump and the liquid pump when the movement of the eject member is detected by the detector.

2. The fuel cell system according to claim 1, wherein the eject member is movable between an initial position and a pushed-in position in which the eject member moves the locking member to the release position, and the detector detects the movement of the eject member as the eject member moves from the initial position to the pushed-in position.

3. The fuel cell system according to claim 1, which further comprises an exhaust passage through which air and products produced by power generation are discharged from the electromotive unit, and a fuel circulation passage through which the fuel is circulated between the electromotive unit and the fuel tank, and wherein the valve mechanism comprises an air valve located in a passage which connects the air pump and the electromotive unit, an exhaust valve in the exhaust passage, and a tank valve in the fuel circulation passage.

4. The fuel cell system according to claim 1, which further comprises a housing including a body which houses the electromotive unit and a bearer section which extends from the body so as to be able to carry the electronic device thereon and houses the locking mechanism.

5. The fuel cell system according to claim 4, wherein the connector is provided at the bearer section, and the locking member of the locking mechanism has a hook which projects from the bearer section and can engage the electronic device.

6. The fuel cell system according to claim 1, wherein the locking mechanism has a magnet on the eject member, and the detector includes a magnetic sensor located corresponding to the magnet.

7. The fuel cell system according to claim 1, which further comprises a mixing tank in which the fuel supplied from the fuel tank is mixed with water, and a cooling fan, and the drive unit stops the cooling fan when the movement of the eject member is detected by the detector.

8. A fuel cell system comprising:

an electromotive unit which generates power based on a chemical reaction, a fuel tank which contains fuel, a passage which is connected to the electromotive unit and through which fluids, including the fuel, water, and air, are circulated, and a valve mechanism which is located in the passage and regulates the circulation of the fluids;

a connector which is connectable to an electronic device and applies the power generated by the electromotive unit to the electronic device;

a locking mechanism which locks the electronic device connected to the connector in a connected position and which releases the lock of the electronic device;

a detector which detects an operation of the locking mechanism; and a drive unit which closes the valve mechanism before the electronic device is released from the lock by the locking mechanism after an eject operation of the locking mechanism is detected by the detector.

9. A fuel cell system comprising:

a generator section including an electromotive unit which generates power based on a chemical reaction, a fuel tank which contains fuel, a passage which is connected to the electromotive unit and through which fluids, including the fuel, water, and air, are circulated;

a connector which is connectable to an electronic device and applies the power generated by the electromotive unit to the electronic device;

a locking mechanism which locks the electronic device connected to the connector in a connected position and which releases the lock of the electronic device;

a detector which detects an operation of the locking mechanism; and a controller which switches the generator section to a non-operating state before the electronic device is released from the lock by the locking mechanism after an eject operation of the locking mechanism is detected by the detector.

10. The fuel cell system according to claim 9, wherein the generator section includes a valve mechanism which is located in the passage and regulates the circulation of the fluids, and wherein the controller includes a drive unit which closes the valve mechanism when the eject operation of the locking mechanism is detected by the detector.

11. The fuel cell system according to claim 10, wherein the generator section includes an air pump which supplies air to the electromotive unit, and a liquid pump which is located in the passage and supplies the fuel to the electromotive unit, and wherein the controller includes a drive unit which stops the air pump and the liquid pump when the eject operation of the locking mechanism is detected by the detector.

* * * * *